March 16, 1954  D. P. FAULK  2,672,543
WELDING HEAT CONTROL
Filed Dec. 29, 1949  2 Sheets-Sheet 1

INVENTOR
DONALD P. FAULK
BY
ATTORNEY

March 16, 1954  D. P. FAULK  2,672,543
WELDING HEAT CONTROL
Filed Dec. 29, 1949  2 Sheets-Sheet 2

INVENTOR
DONALD P. FAULK
BY
ATTORNEY

Patented Mar. 16, 1954

2,672,543

UNITED STATES PATENT OFFICE 2,672,543

WELDING HEAT CONTROL

Donald P. Faulk, Lexington, Mass., assignor to Raytheon Manufacturing Company, Newton, Mass., a corporation of Delaware Application December 29, 1949, Serial No. 135,589

7 Claims. (Cl. 219—4)

This invention relates to heat control timing and more particularly to heat control timing in resistance welding.

In seam welding where rollers are used as the welding electrodes, it has heretofore been customary to use an "on" and "off" timing technique. That is, during the "on" time, intermittent current pulses of constant amplitude were passed through the weld material at the point of weld. During the "off" time, no current was permitted to flow through the weld material. Such "off" time periods were found necessary to prevent the pressure of the rollers from pushing through the molten weld material. The general practice has been to maintain a constant flow of coolant fluid at the point of weld to confine the welding heat to narrow limits of area. During the "off" time periods, this coolant rapidly cooled and solidified the molten weld material to give it sufficient body to withstand the pressure of the rollers in preparation for the succeeding "on" time welding period. The result of such a timing procedure was to produce a substantially rectangular graphical picture of heat versus time at the point of weld. The inception of the "on" time caused a nearly vertical rise in temperature of the weld material to a predetermined constant equilibrium welding temperature at which the weld material reached a molten state. The travel of the electrode rollers along the weld seam at the equilibrium state was such that the temperature at the weld remained substantially constant throughout the "on" time period. At the end of the "on" time period, the weld material was caused to drop nearly vertically in temperature due to the coolant fluid, thus solidifying the molten weld material to provide a solid base for the rollers to ride over preliminary to another "on" time period.

There are many disadvantages to such a heat control plan for seam welding. Because of the extremely rapid rise in temperature at the weld point, a poor weld may result. For example, if a small piece of gas emitting scale exists between the weld members, as often occurs when hot rolled steel is used as the weld material, this rapid temperature rise results in high gaseous pressures for lack of time for the gas to escape. The rapid pressure rise in many instances is sufficient to cause localized explosions creating holes and general porosity at the weld. Also, the rapid rate of cooling causes brittleness at the weld when carbon steels are used, thereby making further fabrication of the material impossible. For example, in the manufacture of steel drums from seam welded sheet steel, a brittle weld tends to tear when the annular reinforcing grooves are formed. Another difficulty is that, when some stainless steels are used as the weld materials, such rapid cooling from the molten state causes destruction of the stainless properties.

The present invention overcomes these defects by providing a novel heat-timing technique. There is no "on" and "off" timing used. Rather, there is effected a gradual rise in weld temperature to a predetermined peak after which the heat cycle is repeated. The heating cycle may be graphically approximated as a saw-tooth wave in which the slope, time interval between cycles, and maximum and minimum temperatures may be varied to accommodate any particular material. Such a relatively gradual increase in heat intensity in the weld prevents sudden high gas pressure spots. The minimum temperature in the cycle is just low enough to prevent breakthrough of the welding electrodes, and yet not so low as to have caused a brittle weld.

Such a heating cycle is accomplished by progressively increasing the intensity of the current pulses at the weld to a selected peak after which the cycle is repeated. The present embodiment for accomplishing this consists generally of inverse parallel connected ignitrons arranged in an alternating current power line and fired by thyratrons at progressively advancing points in the alternating potential cycle of the power source. A base biasing potential, a saw-tooth potential generator, and a step potential generator for progressively increasing the base potential of the saw-tooth potential wave are connected across the grid and cathode of the thyratrons. The saw-tooth and step potential generators are synchronized with the alternating potential source so that, as the base potential rises with each step of the step generator, the thyratrons are made to fire at progressively advancing points in the cycles of the alternating potential source, and thus cause the ignitrons to conduct at corresponding points. One ignitron conducts in the positive half-cycle while the other conducts in the negative half-cycle of the alternating potential source. The firing point in the negative and positive portion of each cycle is maintained the same to prevent current unbalance and consequent saturation losses in the welding transformers fed by the ignitrons.

A timing device is arranged to return the step generator to a base potential at desired intervals determined by its adjustment and thereby provide a time cyclic return to a base firing position. Controls are also provided for adjusting the degree of base biasing potential and the increments between steps of the step potential generator thereby permitting selection of the position of the base firing point and the rate of advance of the succeeding firing points in the cycles of the alternating potential source.

The foregoing and other advantages, objects, and features of the invention will be better understood from the following description taken in connection with the accompanying drawings in which.

Figure 1:
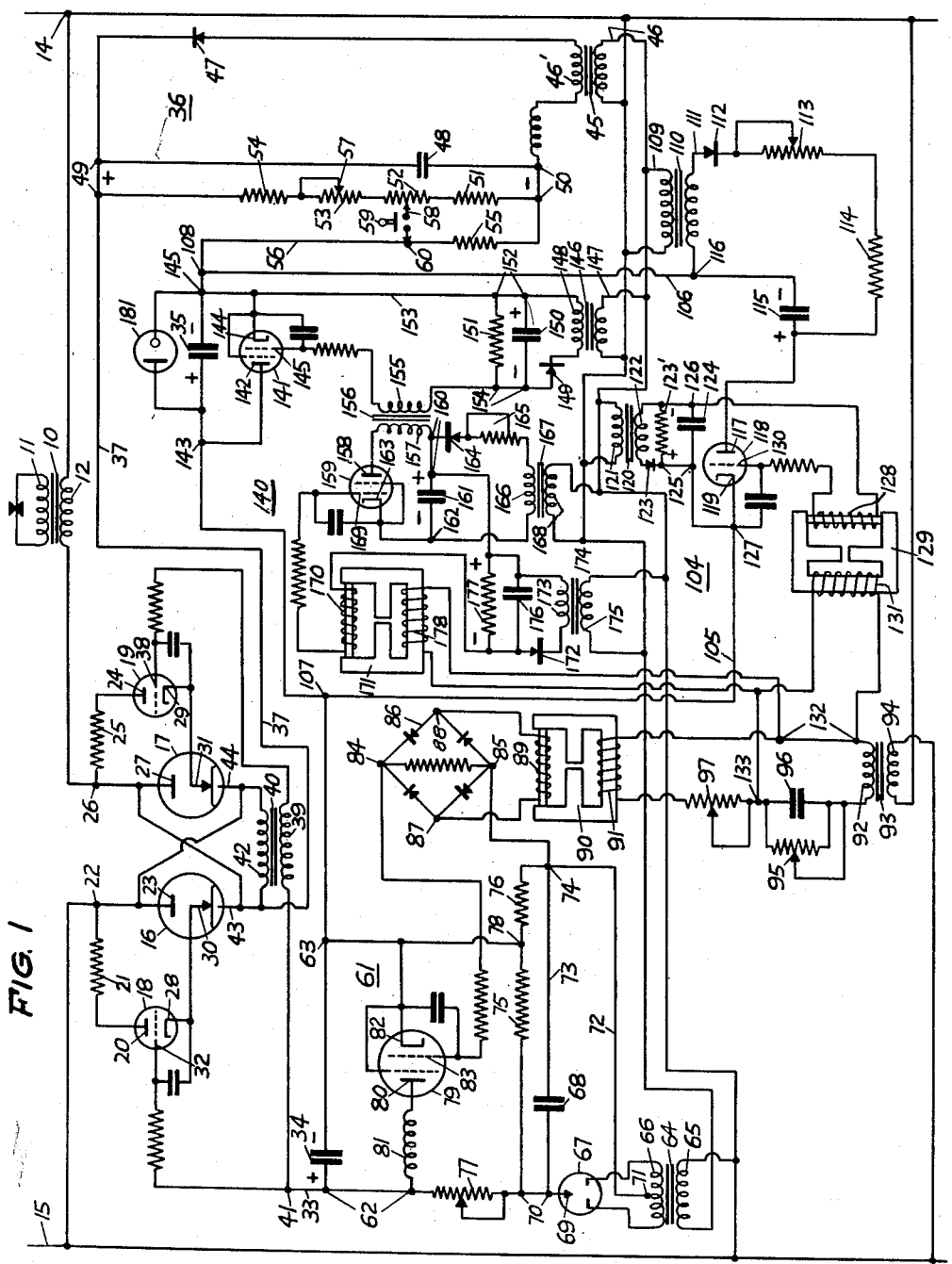
Fig. 1 is a schematic drawing of a preferred embodiment of the invention.

Referring to the drawings in more detail, a welding transformer 10 having a secondary winding 11 for connection to a resistance welding load has a primary winding 12 adapted to be connected to an alternating current power source (not shown) across lines 14 and 15. Any suitable alternating current power source may be used. A pair of inverse parallel connected ignitrons 16 and 17 are connected in series with the primary winding 12 across the alternating current power source lines 14 and 15. The thyratron tubes 18 and 19 are connected for firing the ignitrons 16 and 17, respectively. The anode 20 of thyratron 18 is connected through resistance 21 at the point 22 to the anode 23 of the ignitron 16. The anode 24 of the thyratron 19 is connected through resistance 25 to the point 26 at the anode 27 of the ignitron 17.

Cathodes 28 and 29 of thyratrons 18 and 19, respectively, are connected to igniting or controlling electrodes 30 and 31 of ignitrons 16 and 17, respectively. The grid 32 of thyratron 18 is connected through line 33 in series with a condenser 34, a condenser 35, and a grid biasing constant potential source 36 to the cathode 28 of thyratron 18 by line 37 and igniting electrode 30. A grid 38 of thyratron 19 is connected through a secondary 39 of nullifying transformer 40 to point 41 in line 33. A primary 42 of nullifying transformer 40 is connected across the cathodes 43 and 44 of ignitrons 16 and 17, respectively, to prevent the potential from lines 14 and 15 from appearing at the grid 38 thereby permitting control of both thyratrons 18 and 19 from the single point 41.

A suitable constant potential source 36 comprises a transformer 45 having a primary 46 connected across the power source lines 14 and 15, and a secondary 46' in series with a half-wave rectifying device 47 positioned to provide across a smoothing condenser 48, a potential polarity positive at points 49 with respect to points 50. Points 49 are connected through line 37, cathode 43 and igniting electrode 30, to the cathode 28 of thyratron 18, and points 50 are connected through the capacitances 35 and 34 and a line 33 to the grid 32 of thyratron 18. Therefore, with no charge on condenser 34 or condenser 35, the grid 32 will normally be negative with respect to the cathode 28 during the half cycles of the alternating potential from lines 14 and 15 when the anode 20 is positive with respect to the cathode 28 of the thyratron 18. Due to the nullifying transformer 40 and connection of the grid 38 to the point 41 of line 33, the grid 38 of thyratron 19 will also normally be negative with respect to its cathode 29 during the half cycles when the anode 24 is positive with respect to the cathode 29. Resistances 51, 52, 53 and 54 are arranged in series across the points 49 and 50 of the constant potential source 36, and the resistance 55 is inserted in the line 56 running through the capacitors 35 and 34 to the control grids 32 and 38 of thyratrons 18 and 19, respectively. Resistance 53 is of the potentiometer type. By adjusting an arm 57 of the potentiometer resistance 53, fine adjustments may be made in the amount of negative grid bias at the grids 32 and 38. Resistance 52 is of the variable type and has an adjusting arm 58 connected to one side of a switch 59. The other side of switch 59 is connected to a point 60 in line 56 between resistance 55 and capacitance 35. When the switch 59 is closed, it shunts out resistances 55 and 51 in the grid circuit of thyratrons 18 and 19, thereby substantially reducing the negative bias on grids 32 and 38. The amount of this grid bias reduction may be varied by adjusting the arm 58 along the variable resistance 52. The switch 59 normally remains open.

Figure 3:
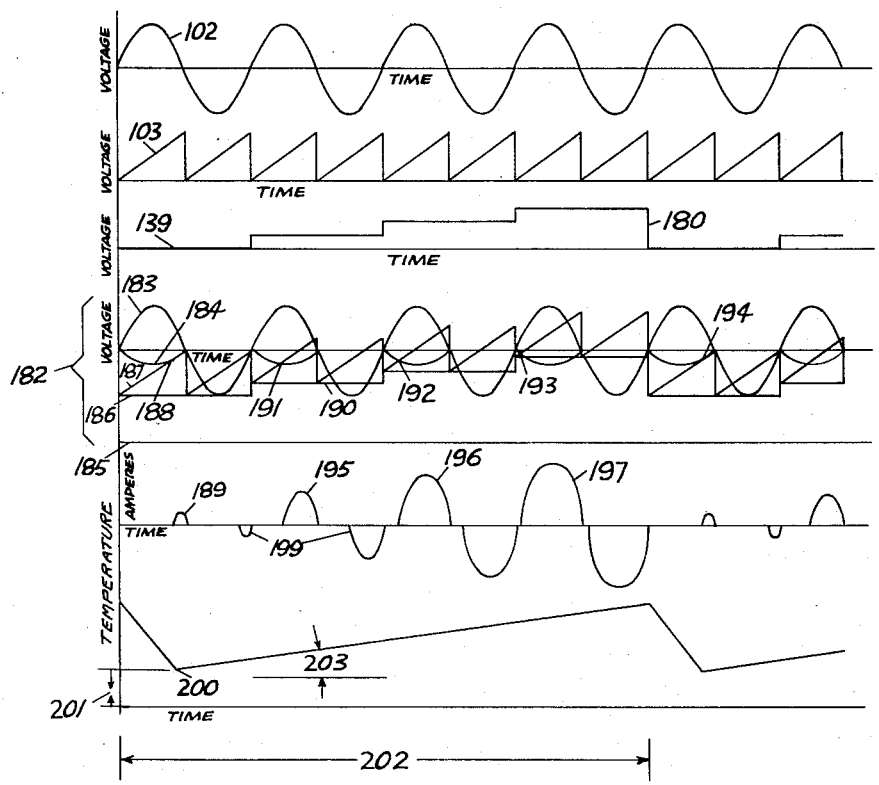
Fig. 3 is a diagram illustrating the operation of a step potential timer used in Fig. 1.
Figure 2:
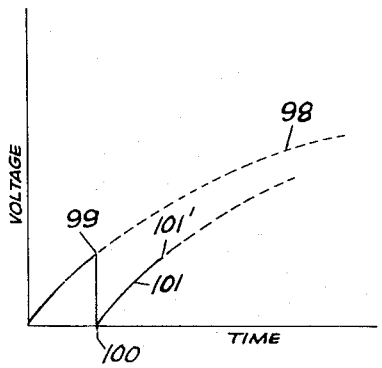
Fig. 2 is a diagram illustrating the operation of a saw-tooth potential wave generator used in Fig. 1.

A saw-tooth potential oscillator 61 is arranged across the condenser 34 at points 62 and 63. In the oscillator 61, a transformer 64, having its primary 65 connected across the power source lines 14 and 15, has the terminals of its secondary coil 66 connected to the anodes of a full-wave rectifying device 67. A smoothing condenser 68 is arranged across a cathode 69 of the rectifying device 67 at point 70, and the midpoint 71 of the secondary coil 66 by lines 72 and 73 connected at point 74. Voltage divider resistances 75 and 76 are connected in series across the points 70 and 74. The cathode 69 of the rectifying device 67 is connected through point 70 and potentiometer resistance 77 to the point 62 in the line 33 on one side of the condenser 34. Point 63 on the other side of the condenser 34 is connected to point 78 between voltage divider resistances 75 and 76. A gas-filled discharge device 79 is connected across a condenser 34 with its anode 80 connected through an inductance coil 81 to point 62 and its cathode 82 connected to the point 63. Due to the directional current characteristics of the rectifying device 67, the condenser 34 will be made to charge with the side 62 positive and the side 63 negative. The rate of charge on condenser 34 may be adjusted by the potentiometer resistance 77. A grid 83 of the gaseous discharge device 79 is connected to points 84 and 85 of a balanced bridge rectifying device 86 to the point 74. Because of the voltage divider resistance 76, the grid 83 will normally be negative with respect to the cathode 82 of the gaseous discharge device 79, thereby preventing the discharge device 79 from firing. Points 87 and 88 of the balanced rectifying bridge 86 are connected to the ends of a secondary winding 89 of an impulse transformer 90 whose primary winding 91 is connected in series with a secondary coil 92 of a transformer 93 whose primary coil 94 is connected across the power source lines 14 and 15. A potentiometer resistance 95 in parallel with a condenser 96 is connected in series with another potentiometer resistance 97 in the series circuit of transformer windings 91 and 92. By adjusting the potentiometer resistances 95 and 97, the point in the alternating potential cycle from lines 14 and 15 at which a pulse will appear at the secondary 89 of the transformer 90 may be varied. The rectifying devices of the balanced rectifying bridge 86 are positioned to make a positive pulse appear at the grid 83 of the gaseous discharge device 79 once for each half cycle of the alternating potential from lines 14 and 15. Because of the rate of charge on condenser 34 as explained above, the voltage versus time picture across the condenser 34 may be shown by curve 98 in Fig. 2. The point 99 on curve 98 designates an amount of charge on the condenser 34 effected during a half-cycle time interval of the alternating potential source from lines 14 and 15. The potentiometer resistance 97 is adjusted to cause the positive pulse from the impulse transformer 90 to appear at the grid 83 at the end of each half-cycle of the alternating potential source of lines 14 and 15, thereby triggering the gas discharge device 79 causing it to conduct current so as to discharge, nearly instantaneously, the condenser 34, the charge of which has just reached point 99 (Fig. 2). Due to the inductance coil 81, the drop in potential of condenser 34 will experience a slight reversal to the point 100 to insure extinguishing the gaseous discharge device 79. When the gaseous discharge tube 79 is extinguished, the condenser 34 will again charge in a similar manner, as explained above, and shown by line 101 (Fig. 2) for the next half-cycle of the alternating potential from lines 14 and 15, until it reaches a point 101' at the end of the next half-cycle, at which point the impulse transformer again triggers gaseous discharge device 79. This periodic charge and discharge of condenser 34 will continue in a cyclic manner twice for each flow cycle of the alternating potential source and is shown in Fig. 3 where curve 102 represents the potential cycles from alternating lines 14 and 15, and the saw-tooth potential curve 103 represents the corresponding potential verus time picture appearing across the condenser 34.

Figure 4:
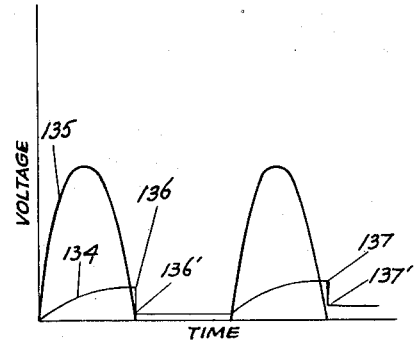
Fig. 4 is a series of graphs illustrating the overall operation of the embodiment in Fig. 1.

A step potential generator 104 is arranged to charge the condenser 35 through lines 105 and 106 connected at points 107 and 108 across the condenser 35. A primary coil 109 of transformer 110 connected across the alternating power source of lines 14 and 15 has its secondary coil 111 in series with a half-wave rectifying device 112, a potentiometer resistance 113, a current limiting resistance 114 and a step control capacitance 115. Because of the half-wave rectifying device 112, the condenser 115 will receive a charge only during alternate half-cycles of the potential source from lines 14 and 15 so that polarity across the condenser 115 will always be in the same direction. The negative side of condenser 115 is connected at point 116 through line 106 to point 108 on the negative side of condenser 35, and the positive side of condenser 115 is connected to an anode 117 of a gaseous discharge device 118 having a cathode 119 connected by the line 105 to point 107 on the negative side of the condenser 35. A transformer 120 having a primary 121 connected across the power source lines 14 and 15 has a secondary 122 in series with a half-wave rectifying device 123. A resistance 123' and smoothing capacitance 124 are connected across the secondary winding 122 and rectifying device 123 at points 125 and 126. Due to the position of rectifying device 123, the point 125 will normally be positive with respect to the point 126. The positive point 125 is connected to the cathode 119 of the gaseous discharge device 118 at point 127. The negative point 126 is connected through the secondary winding 128 of impulse transformer 129 to a grid 130 of the gaseous discharge device 118. The grid 130 will, therefore, normally be more negative than the cathode 119, thereby preventing the gaseous discharge device 118 from firing. A primary 131 of the impulse transformer 129 has one of its ends connected to a point 132 between the secondary 92 of transformer 93 and the primary 91 of the impulse transformer 90. The other end of the primary 131 of impulse transformer 129 is connected to a point 133 between the potentiometer resistances 95 and 97. Because of transformer 93, the impulse transformer 129 will effect one positive pulse and one negative pulse at the secondary 128 for each complete cycle of the alternating potential from lines 14 and 15. The pulse which makes the grid 130 more negative with respect to the cathode 119 will have no effect on the discharge device 118, but the pulse which is positive with respect to grid 130 and cathode 119 will trigger the discharge device 118 causing it to discharge the condenser 115 into the condenser 35. When the charges between condensers 115 and 35 have equalized, the potential between cathode 119 and anode 117 will be zero, thus extinguishing the discharge device 118. The condenser 115 will then continue to charge to a higher potential. By adjusting the potentiometer resistance 95, the point in the cycle of the alternating current potential from lines 14 and 15, at which the positive pulse will occur in the secondary 128 of impulse transformer 129, may be varied. In this instance, potentiometer resistance 95 is adjusted to cause discharge device 118 to be triggered at the end of each positive half-cycle of the alternating potential source from lines 14 and 15. Referring to Fig. 4, the potential versus time curve on the condenser 115 will appear as line 134 due to the adjustment of potentiometer resistance 113. If, for example, the condenser 115 is a ½ microfarad condenser and the condenser 35 is a two microfarad condenser, and the maximum potential across transformer secondary 111 is 500 volts and varies as line 135, the charge on the condenser 115 in the positive half-cycle of the alternating potential from lines 14 and 15 may be sufficient to create a potential of 50 volts across condenser 115 shown by point 136 on curve 134 (Fig. 4), at which point the discharge device 118 is triggered to discharge the condenser 115 into the condenser 135. Because of the difference in capacity between condenser 35 and 115, a voltage of 10 volts will be created across the capacitor 35 in a nearly instantaneous operation. The voltage across the condenser 115 will also be 10 volts as shown by the point 136' (Fig. 4). In the next positive half-cycle, the condenser 115 will again be charged by approximately 50 volts since it is still operating at a relatively small potential compared to the transformer potential and will appear as a total of 60 volts, as shown at point 137, at the end of the positive cycle when the gaseous discharge tube 118 is again triggered to discharge the condenser 115 into the condenser 35, raising the voltage across the condenser 35 to approximately 20 volts, which will also be the voltage across the condenser 115 and may be shown by the point 137'. The condenser 115 will continue to charge and discharge in a cyclic manner, building up the potential across the condenser 35 in approximately equal increments, each increment having a time duration of two half-cycles of the alternating potential source, and may be shown by the curve 139 in Fig. 3.

The condenser 35 is periodocally discharged by a step-timing counter 140. The step-timing counter 140 has a gaseous discharge device 141 connected across the condenser 35. The anode 142 of the gaseous discharge device 141 is connected to a point 143 on the positive side of the condenser 35, and the cathode 144 of the gaseous discharge device 141 is connected at point 145 to the negative side of the condenser 35. A constant biasing potential source is connected across grid 145 and cathode 144 of the gaseous discharge device 141. In this instance, the constant potential source comprises the transformer 146 having a primary 147 connected across the alternating potential source from lines 14 and 15 and a secondary coil 148 in series with a rectifying device 149 with a smoothing condenser 150 and resistance 151. The condenser 150 and resistance 151 are connected in parallel across the series-connected rectifying device 149 and secondary coil 148. The positive side 152 of the constant potential source is connected through line 153 to the cathode 144 of the gaseous discharge device 141. The negative side 154 is connected through a secondary coil 155 of a triggering transformer 156 to the grid 145 of the gaseous discharge device 141. Since the grid 145 will normally be maintained negative with respect to the cathode 144, the gaseous discharge device 141 will normally not conduct, and will, therefore, permit the step potential on the condenser 35 to progressively increase, as explained above, until a triggering pulse from the transformer 156 makes the grid 145 sufficiently positive with respect to the cathode 144 to cause the gaseous discharge device 141 to conduct and thereby discharge the condenser 35. To obtain the triggering pulse, transformer 156 has the ends of its primary coil 157 connected between an anode 158 of a gaseous discharge device 159 and the positive side 160 of a timing condenser 161 whose negative side 162 is connected to a cathode 163 of the gaseous discharge device 159. Across the terminals 160 and 162 are connected in series a half-wave rectifying device 164, potentiometer resistance 165, and the secondary coil 166 of a transformer 167 whose primary 168 is connected across the alternating power source lines 14 and 15. Because of the unidirectional characteristic of the half-wave rectifying device 164, current will flow to increase the potential across the condenser 161 during alternate half-cycles of the alternating potential source of lines 14 and 15, thus making the anode 158 progressively more positive with respect to the cathode 163 of the gaseous device 159. The rate of increase of the potential across the condenser 161 for each conducting half-cycle may be controlled by adjusting the resistance arm of the potentiometer resistance 165. Grid 169 is connected through a secondary 170 of an impulse transformer 171 and a constant potential source to the point 160 on the positive side of the timing condenser 161. The constant potential source in this instance comprises a half-wave rectifying device 172 in series with a secondary 173 of transformer 174, whose primary 175 is connected across the alternating power source lines 14 and 15, a smoothing capacitance 176 and a resistance 177 in parallel across the series rectifying device 172 and transformer secondary 173. The rectifying device 172 is arranged so that the potential of the grid 169 will normally be highly negative with respect to the cathode 163 of the gaseous discharge device 159. Primary 178 of the impulse transformer 171 has one side connected to the point 133 between potentiometer resistance 91 and potentiometer resistance 95. The other side of the primary 178 is connected to a point 132 between the secondary 92 of the transformer 93 and the primary 91 of the impulse transformer 90. Thus, the impulse transformer 171 is timed to produce a pulse at the secondary 170 at the same instant as the pulse produced at the secondary 128 of the impulse transformer 129. The impulse transformer 171 will produce two pulses for each complete cycle of the alternating potential from lines 14 and 15, one positive and one negative. The negative pulse from the secondary 170 will make the grid 169 increasingly negative with respect to the cathode 163 so that the gaseous discharge device 159 will not conduct. The positive pulse, while it is in a direction tending to overcome the negative bias on the grid 169, has a magnitude which is insufficient of itself to trigger the gaseous device 159, but the charge on the condenser 161 is in series opposition to the potential across the resistance 177. Thus, as the potential across the condenser 161 continues to increase, the negative bias of grid 169 due to the potential across the resistance 177 continues to decrease at a rate determined by the setting on the potentiometer resistance 165. When the negative bias on grid 169 becomes sufficiently small, the positive pulse from the secondary 170 of impulse transformer 171 is sufficient to suddenly make the grid sufficiently positive with respect to the cathode 163 to cause the gaseous discharge device 159 to conduct to discharge the condenser 161. The condenser 161 will discharge rapidly through the primary 157 of the transformer 156 thereby causing a triggering pulse in the secondary 155 of such a polarity and magnitude as to make the grid 145 sufficiently positive with respect to the cathode 144 to cause the gaseous discharge device 141 to conduct, thereby discharging the condenser 35. Since the impulse transformer 171 is arranged to produce impulses at the same time as the impulse transformer 129, a triggering impulse will occur at the end of the cycle of alternating potential from the lines 14 and 15. The discharge of the condenser 35 will, therefore, occur at a point at the end of a complete cycle, and make the discharge appear graphically as at 180 of the step-timing curve 139 in Fig. 3. The number of cycles between discharges of the condenser 35 may be varied in this instance by adjusting the potentiometer resistance 165.

To control the maximum possible potential across the condenser 35, a gaseous discharge device 181 of the voltage regulator type is connected across the condenser 35 at points 143 and 145.

Referring now to the general operation of the invention, it may be graphically shown as at 182 of Fig. 3. The alternating potential appearing across the anode 23 and cathode 43 of ignitron 16 may be shown by curve 183, which is also the potential picture appearing across the anode 20 and the cathode 28 of the thyratron 18. The curve 184 shows generally the potential at which the grid 32 will cause the thyratron to conduct. When the switch 58 of the constant potential source 36 is open, the resistances 55, 51 and part of the resistance 32 cause the grid 32 of thyratron 18 to have a large negative bias 185 (Fig. 3) with respect to the cathode 28. In such case, the sum of the potential from the condenser 34 and the maximum potential from the condenser 35 are insufficient at any time to reduce the negative bias of grid 32 to the point where the thyratron 18 will conduct. However, when the switch 58 is closed, thereby shunting out the resistances 55 and 51, and a part of 52, a base biasing potential 186 is effected at grid 32 of thyratron 18. In such case, the sawtooth potential 187 across the condenser 34 will cause the potential of the grid 32 to become sufficiently positive at the point 188 to cause the thyratron 18 to conduct, and thereby causing the ignitron 16 to fire at a corresponding point so as to pass a current pulse 189 by means of transformer 10 through the load. As the step potential 190 across the step condenser 35 builds up, the bias of grid 32 will become sufficiently positive to cause the thyratron 18 to conduct at progressively advancing points in the positive half-cycle of the alternating potential 183 as shown by 191, 192 and 193, and will cause corresponding current pulses of progressively increasing intensity and duration as shown at 195, 196 and 197, respectively, until the condenser 35 is discharged to repeat the cycle. Due to the inverse parallel connection of ignitron 17 and the nullifying transformer 40, a similar picture will appear for each negative half-cycle of the potential source 83 so as to produce negative pulses of current 199 through the load. The resulting heat picture of the weld materials at the load will, therefore, appear approximately as curve 200 (Fig. 3). By adjusting the variable resistance arm 60 of the constant potential source 36, the initial point 188 (Fig. 3) in each cycle at which the thyratron 18 will conduct so as to cause ignitron 16 to conduct may be varied, thereby varying the intensity of the initial current pulse 189 and thus the minimum temperature 201 in the heat cycle 200 at the weld load. By adjusting the potentiometer resistance 165 of the step timer 140, the length of the heat cycle may be varied. By adjusting the potentiometer resistance 113 of the potential step control 104, the slope 203 of the heat curve 200 may be varied. A heat cycle adjustment, therefore, most suitable to any particular material may be obtained.

This invention is not limited to the particular details of construction and processes described as many equivalents will suggest themselves to those skilled in the art. It is accordingly desired that the pending claims be given a broad interpretation commensurate with the scope of the invention within the art.

What is claimed is:

1. The system comprising a transformer having a secondary winding for supplying power to a load and a primary winding, means for connecting said primary winding to a source of alternating current including two gaseous discharge devices in inverse parallel connection each having an anode and a cathode and a control electrode, means for energizing said control electrodes to cause said gaseous devices to discharge thereby connecting said alternating current source to said primary winding, saw-tooth potential wave generating means, step potential generating means connected to said saw-tooth potential generating means in a manner to provide a progressively increasing potential base for said saw-tooth potential generating means, means connecting said last-two-mentioned means to said energizing means so as to cause said energizing means to energize said control electrodes at progressively advancing points in the cyclic pattern of said alternating current source, each of said advances corresponding to a potential step of said step generating means, and time control means for returning the potential of said step generating means to a base potential position.

2. The system comprising a transformer having a secondary winding for supplying power to a load and a primary winding, means for connecting said primary winding to a source of alternating current including two gaseous discharge devices in inverse parallel connection each having an anode and a cathode and a control electrode, means for energizing said control electrodes to cause said gaseous devices to discharge thereby connecting said alternating current source to said primary winding, saw-tooth potential wave generating means, step potential generating means connected to said saw-tooth potential generating means in a manner to provide a progressively increasing potential base for said saw-tooth potential generating means, adjustable potential means connected to said last-two-mentioned potential generating means to provide a base potential for said last-two-mentioned potential generating means, means connecting said last-three-mentioned means to said energizing means so as to cause said energizing means to energize said control electrodes at progressively advancing points with respect to a base energizing point in the cyclic pattern of said alternating current source, each of said advances corresponding to a potential step of said step generating means, and time control means for returning the potential of said step generating means to said base potential position.

3. The system comprising a transformer having a secondary winding for supplying power to a load and a primary winding; means for connecting said primary winding to a source of alternating current including two ignitrons in inverse parallel connection each having an anode and a cathode and a control electrode; means for energizing said control electrodes including a thyratron for each of said ignitrons, each of said thyratrons having an anode and cathode and control grid; time control means for causing said thyratrons to energize said control electrodes at progressively advancing points in the cyclic pattern of said alternating current source, said time control means including two capacitances and an adjustable potential source connected in series across said control grid and cathode of each of said thyratrons, means for cyclicly charging and discharging one of said condensers in a sawtooth potential time pattern, means for charging the other of said condensers in a stepped potential time pattern; and time control means for periodically discharging said last-mentioned condenser thereby providing at said last-mentioned condenser a cyclic stepped potential time pattern.

4. The system comprising a transformer having a secondary winding for supplying power to a load and a primary winding, means for connecting said primary winding to a source of alternating current including two ignitrons in inverse parallel connection each having an anode and a cathode and a control electrode; means for energizing said control electrodes including a thyratron for each of said ignitrons, each of said thyratrons having an anode and cathode and control grid; time control means for causing said thyratrons to energize said control electrodes at progressively advancing points in the cyclic pattern of said alternating current source, said time control means including two capacitances and an adjustable potential source connected in series across said control grid and cathode of each of said thyratrons, means for charging one of said condensers in a direction making said control grid more positive, means for controlling the rate of charge of said charging means, control means for discharging said condenser once for each half-cycle of said alternating current source, means for charging the other of said condensers in a direction making said control grid more positive, means for causing said charging means to charge said other condenser in steps, each of said steps having a duration of an even number of successive half-cycles of said alternating current source; and time control means for periodically discharging said last-mentioned condenser thereby providing at said last-mentioned condenser a cyclic stepped potential time pattern.

5. In a step timing welding control system for use with an alternating potential source, a gaseous discharge device having an anode, a cathode and a control grid; time control means connected to said control grid and cathode to cause said thyratron to conduct during alternate half-cycles of said alternating potential source, said time control means including two capacitances and an adjustable potential source connected across said control grid and cathode of said thyratrons, means for cyclically charging and discharging one of said condensers in a saw-tooth potential time pattern, means for charging the other of said condensers in a stepped potential time pattern, and time control means for periodically discharging said last-mentioned condenser thereby providing at said last-mentioned condenser a cyclic stepped potential time pattern.

6. A method of welding comprising urging the parts to be welded together, producing an alternating electric current in the region of the junction of the parts, and varying the intensity of said current for a plurality of cycles, each cycle varying in intensity from a minimum value gradually increasing with time to a maximum value which exists within only one period of said alternating current and then returning within one period of said alternating current to said minimum value.

7. In a welding system, means for urging the parts to be welded together, means for producing an alternating electric current in the region of the junction of the parts, and means for varying the intensity of said current for a plurality of cycles, each cycle varying in intensity from a minimum value gradually increasing with time to a maximum value which exists within only one period of said alternating current and then returning substantially within one period of said alternating current to said minimum value.

DONALD P. FAULK.

References Cited in the file of this patent

UNITED STATES PATENTS

| Number | Name | Date |
|---|---|---|
| 1,637,063 | Thomson | July 26, 1927 |
| 2,210,710 | Diamond | Aug. 6, 1940 |
| 2,233,810 | Dawson | Mar. 4, 1941 |
| 2,243,833 | Bohn | June 3, 1941 |
| 2,255,652 | Dawson et al. | Sept. 9, 1941 |
| 2,314,691 | Dawson et al. | Mar. 23, 1943 |
| 2,329,090 | Smith | Sept. 7, 1943 |
| 2,374,044 | Smith | Apr. 17, 1945 |
| 2,390,982 | Bivens | Dec. 18, 1945 |
| 2,401,780 | Undy | June 11, 1946 |
| 2,420,919 | Undy | May 20, 1947 |